(12) United States Patent
Hong et al.

(10) Patent No.: US 9,252,413 B2
(45) Date of Patent: Feb. 2, 2016

(54) LITHIUM SECONDARY BATTERY

(71) Applicants: Ji-Jun Hong, Seoul (KR); In-Beom Hwang, Seoul (KR); Sung-Tae Ko, Chungcheongnam-do (KR); Yoon-Jeong Heo, Chungcheongnam-do (KR)

(72) Inventors: Ji-Jun Hong, Seoul (KR); In-Beom Hwang, Seoul (KR); Sung-Tae Ko, Chungcheongnam-do (KR); Yoon-Jeong Heo, Chungcheongnam-do (KR)

(73) Assignee: KOKAM CO., LTD., Gyeonggi-do (KR)

(*) Notice: Subject to any disclaimer, the term of this patent is extended or adjusted under 35 U.S.C. 154(b) by 95 days.

(21) Appl. No.: 14/094,265

(22) Filed: Dec. 2, 2013

(65) Prior Publication Data
US 2014/0087233 A1    Mar. 27, 2014

Related U.S. Application Data

(63) Continuation of application No. PCT/KR2012/002334, filed on Mar. 29, 2012.

(30) Foreign Application Priority Data

May 31, 2011    (KR) .................. 10-2011-0051886

(51) Int. Cl.
H01M 4/131    (2010.01)
H01M 4/133    (2010.01)
H01M 2/16    (2006.01)
H01M 4/485    (2010.01)
H01M 4/587    (2010.01)
H01M 10/0525    (2010.01)

(52) U.S. Cl.
CPC ............ *H01M 2/1686* (2013.01); *H01M 4/131* (2013.01); *H01M 4/133* (2013.01); *H01M 4/485* (2013.01); *H01M 4/587* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2007/0082265 A1 | 4/2007 | Itou et al. | |
| 2009/0148762 A1* | 6/2009 | Kasamatsu et al. | 429/145 |
| 2012/0225344 A1 | 9/2012 | Hong et al. | |

FOREIGN PATENT DOCUMENTS

| | | | | |
|---|---|---|---|---|
| EP | 2 248 847 A1 | 11/2010 | | |
| EP | 2 450 988 A1 | 5/2012 | | |
| EP | 2450988 | * 5/2012 | ............... | H01M 4/48 |
| JP | 2001-243950 A | 9/2001 | | |
| JP | 2005-209570 A1 | 8/2005 | | |

(Continued)

OTHER PUBLICATIONS

International Search Report for PCT Application No. PCT/KR2012/002334 Dated Sep. 26, 2012.

*Primary Examiner* — Cynthia K Walls
(74) *Attorney, Agent, or Firm* — Lei Guo; Abel Law Group, LLP

(57) ABSTRACT

The present invention relates to a lithium secondary battery. More specifically, according to embodiments of the present invention the lithium battery, which includes a cathode, an anode, and a separate membrane inserted between the cathode and the anode, is characterized in that the separator membrane is a polyolefin porous membrane which has an aramid coating layer; and the cathode includes a lithium metal oxide cathode active material which has an olivine-type iron phosphate lithium coating layer, or the anode includes a carbon anode active material which has a spinel-type lithium titanium oxide coating layer. The lithium secondary battery in accordance with embodiments of the present invention has excellent basic electric performance and improved stability.

14 Claims, 6 Drawing Sheets

(56) References Cited

FOREIGN PATENT DOCUMENTS

| | | |
|---|---|---|
| JP | 2010-517218 A | 5/2010 |
| JP | 2011-90876 A | 5/2011 |
| KR | 20080029878 A | 4/2008 |
| KR | 20100098559 A | 9/2010 |
| KR | 20100126394 A | 12/2010 |
| KR | 20100127433 A | 12/2010 |
| KR | 20110023067 A | 3/2011 |
| TW | 200705734 A | 2/2007 |
| WO | 2008/156033 A1 | 12/2008 |
| WO | 2009/057834 A1 | 5/2009 |
| WO | 2010/053222 A1 | 5/2010 |
| WO | 2010/137753 A1 | 12/2010 |
| WO | 2011/059154 A1 | 5/2011 |

* cited by examiner

FIG. 2
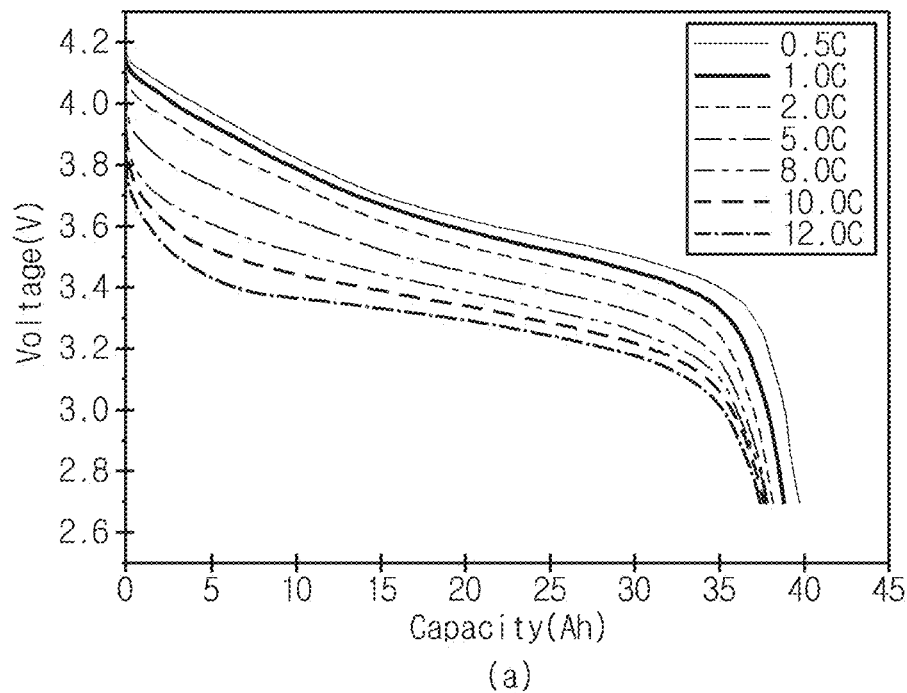
(a)
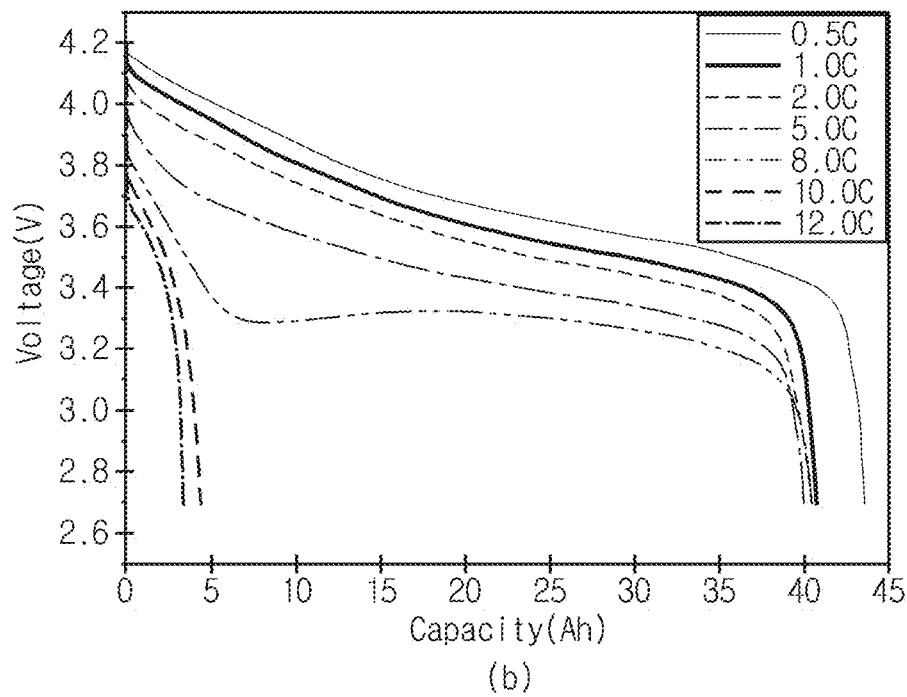
(b)

LITHIUM SECONDARY BATTERY

CROSS-REFERENCE TO RELATED APPLICATION

The present application is a continuation of International Application No. PCT/KR2012/002334 filed on Mar. 29, 2012, which claims priority to Korean Patent Application No. 10-2011-0051886 filed in the Republic of Korea on May 31, 2011, the disclosures of which are incorporated herein by reference in their entireties.

TECHNICAL FIELD

The present disclosure relates to a lithium secondary battery. More particularly, the present disclosure relates to a lithium secondary battery with an improved cycle life and enhanced safety.

BACKGROUND ART

As the issue of environmental protection and pollution is becoming more severe, alternative energy sources are being developed around the world as a solution. As a secondary battery in a field of endeavor focused on alternative energy development, a small-sized lithium secondary battery has been replaced by a lithium secondary battery as a power source for operating mobile electronic communication equipments that require high performance, such as, for example, camcorders, mobile phones, laptop computers, and the like, and occupies a dominant position as a power supply. Recently, development is being actively made on a medium and large-sized lithium secondary battery in a hybrid electric vehicle (HEV) and an electric vehicle (EV) using high output characteristics. Further, research and development is being actively made in various application fields of industries all over the world including Japan, Europe, USA as well as Korea to develop a lithium secondary battery as an environment-friendly power source of uninterruptible power supplies, electromotive tools, ships, satellites, radio sets and weapon systems for military purposes, and the like.

A lithium secondary battery has a structure comprising an assembly including a cathode and an anode coated with an active material capable of intercalating or disintercalating lithium ions and a porous separator membrane interposed between the cathode and the anode to electrically separate the cathode from the anode, and an organic electrolyte solution or a polymer electrolyte solution including lithium salts, filled in the assembly. A lithium metal oxide having a high average voltage is used as a cathode active material, for example, $LiCoO_2$, $LiNiO_2$, $LiNi_xCo_yAl_zO_2$, $LiNi_xCo_yMn_zO_2$, $LiMn_2O_4$, and the like, a carbon material or a metal or non-metal oxide having a low average potential is used as an anode active material, and a porous sheet made using a polyolefin-based polymer, for example, polyethylene (PE), polypropylene (PP), and the like, is mainly used as a separator membrane.

However, in a case in which the cathode active material discussed in the foregoing is used, a surface transition metal-deficient layer caused by a decomposition phenomenon of the electrolyte solution is formed, and obstructs movement of the lithium ions and electrons, affecting high rate discharge, which causes gas to generate inside of the battery due to a side reaction with the electrolyte solution, thereby releasing metal, so that cycling characteristics deteriorate due to a structural change, and further, oxygen is generated due to an increase in internal temperature of the battery caused by an abnormal operation of the battery, which involves a risk of thermal runaway, raising safety concerns.

In a case in which the carbon-based anode active material is used, the lithium ions inserted in the layered structure exhibit an irreversible capacity of 5 to 25% during initial charge and discharge, and this irreversible capacity leads to consumption of the lithium ions and prevents complete charge or discharge of at least one active material, resulting in reduced energy density of the battery. Also, the decomposition reaction of the electrolyte solution on the surface of the active material forms a passivation layer or a solid electrolyte interface (SEI) on the surface of the active material, and when the passivation layer is non-uniform or excessively thick, the resistance increases, causing deterioration in high rate characteristics. Further, due to a lithium compound generating on the surface of the anode, a capacity reduction and output characteristics degradation results from lithium loss, and in the long run, deterioration in cycle characteristics occurs.

The polyolefin-based separator membrane has a safety melting point of 200° C. or below, and so in terms of safety, it is inevitable to use a porous separator membrane having a shut-down function. Also, if temperature continues to increase after shut-down, shape maintenance is an important requisite. However, if an overcurrent flows due to a short circuit caused by an internal or external factor, generally, the olefin-based separator membrane experiences thermal contraction and melting due to heat generation, circuit malfunction, or external temperature increase, causing a short circuit between electrodes, which may produce fire.

DISCLOSURE

Technical Problem

Therefore, it is an object of the present disclosure to provide a lithium secondary battery with improved safety while maintaining excellent basic functions.

Technical Solution

To achieve the above-mentioned object, a lithium secondary battery according to the present disclosure including a cathode, an anode, and a separator membrane interposed between the cathode and the anode is characterized in that the separator membrane is a polyolefin porous membrane having an aramid coating layer, and the cathode includes a cathode active material that is a lithium metal oxide having an olivine-type iron phosphate lithium coating layer, or the anode includes an anode active material that is a carbon material having a spinel-type lithium titanium oxide coating layer.

In another aspect of the present disclosure, the cathode may include a cathode active material that is a lithium composite metal oxide having an olivine-type iron phosphate coating layer, and the anode may include an anode active material that is a carbon material having a lithium titanium oxide coating layer.

In the present disclosure, the polyolefin porous membrane may have a thickness between 10 μm and 30 μm.

In the present disclosure, the aramid coating layer may have a thickness between 2 μm and 10 μm.

In the present disclosure, a content of the olivine-type iron phosphate lithium may be 1 part by weight to 3 parts by weight based on 100 parts by weight of lithium metal oxide.

In the present disclosure, a content of the spinel-type lithium titanium oxide may be 1.5 parts by weight to 2.5 parts by weight based on 100 parts by weight of carbon material.

Advantageous Effects

A lithium secondary battery according to the present disclosure may minimize a decomposition reaction of an electrolyte solution by using concurrently an electrode active material and a separator membrane each coated with a specific material, thereby improving electrical performance and long-term cycle characteristics as well as effectively enhancing safety of the battery.

DESCRIPTION OF DRAWINGS

The accompanying drawing illustrates a preferred embodiment of the present disclosure and together with the foregoing disclosure, serves to provide further understanding of the technical spirit of the present disclosure. However, the present disclosure is not construed as being limited to the drawing.

FIG. 2(a) is a graph showing high rate discharge characteristics of a lithium secondary battery manufactured according to Example 1; and FIG. 2(b) is a graph showing high rate discharge characteristics of a lithium secondary battery manufactured according to Comparative Example 1.

MODE FOR DISCLOSURE

Figure 1:
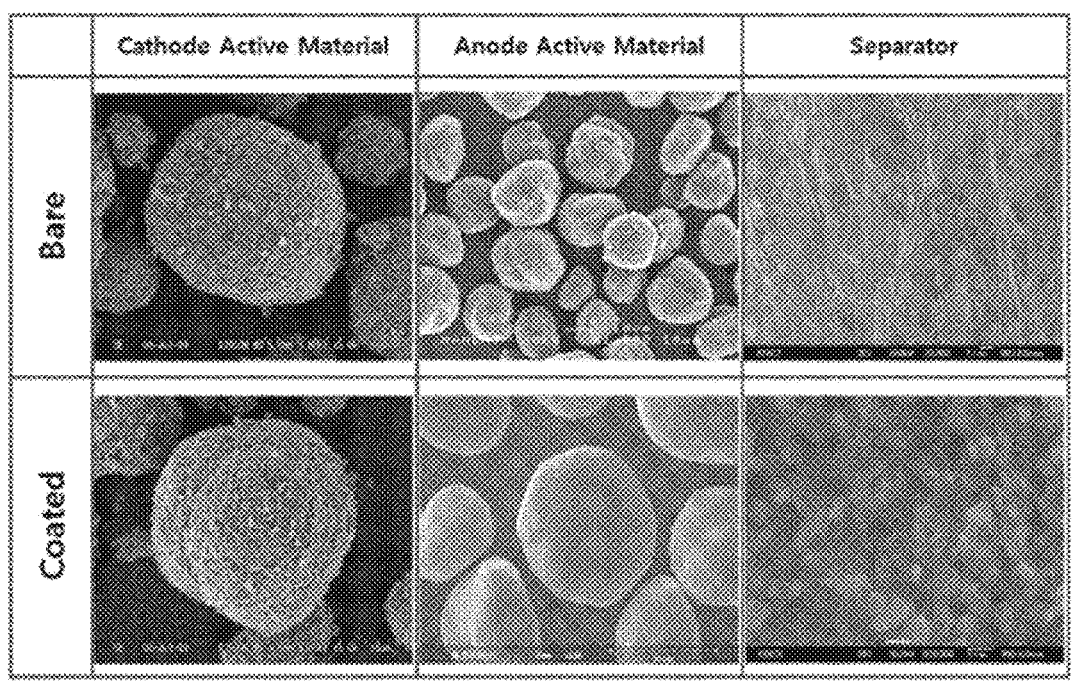
FIG. 1 is a scanning electron microscopy (SEM) image of each material before and after coating (a: cathode active material, b: anode active material, c: separator).

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A lithium secondary battery of the present disclosure is characterized in that a separator membrane is a polyolefin porous membrane having an aramid coating layer.

Since the olefin-based separator membrane generally melts at 200° C. or below, it has a shut-down function to block the movement of ions and electrons. The aramid organic compound has a safety melting point of 400° C. or higher, and thus allows the separator membrane to maintain its sheet shape at a high temperature, which allows the lithium secondary battery to ensure safety by preventing the occurrence of an internal short causing a secondary fire, as well as providing a low self discharge rate by arranging micropores having a predetermined rule in an alternating manner.

The polyolefin porous membrane usable in the present disclosure may be any type of polyolefin porous membrane that can be used as a separator membrane in the art, for example, a porous membrane of a polymer selected from the group consisting of polyethylene (PE), polypropylene (PP), polybutene (PB), polymethylpentene (TPX), and copolymers thereof, however the present disclosure is not limited in this regard. Also, a thickness of the polyolefin porous membrane is preferably 10 μm to 30 μm. When the thickness is less than 10 μm, it is difficult to ensure a sufficient tensile strength or elongation of a substrate and therefore difficult to manufacture, and when the thickness is greater than 30 μm, a cell thickness increases, and as a result, an energy density decreases such that it is inappropriate to use as a separator membrane.

Also, preferably, the polyolefin porous membrane has an air permeability of 300 sec/100 ml or less, a porosity of 40 to 55%, and a breaking strength of 1,000 kgf/cm2 or higher, more preferably, 1,200 kgf/cm2 or higher, however the present disclosure is not limited in this regard. The polyolefin porous membrane is not greatly reduced in air permeability or porosity despite further including the aramid coating layer. Since the aramid coating layer of the present disclosure is a coating layer formed by applying an aramid solution to the polyolefin porous membrane at a low thickness and drying, rather than a film layer formed by attaching an aramid polymer film to the polyolefin porous membrane, the aramid coating layer does not block the pores of the polyolefin porous membrane.

In the present disclosure, the aramid used as a coating material of the polyolefin porous membrane may be a para-aramid, for example, poly(para-phenylene terephthalamide)), a meta-aramid, for example, poly(meta-phenylene isophthalamide, or a mixture thereof.

The aramid is dissolved in a proper solvent and coated on at least one surface of the polyolefin porous membrane. Preferably, the aramid coating layer has a thickness of 2 μm to 10 μm. When the thickness is less than 2 μm, there is difficulty in ensuring uniformity and suppressing thermal deformation of the substrate, which may make it difficult to ensure safety, and when the thickness is greater than 10 μm, an overall thickness of the separator membrane increases and an increase in cell thickness occurs, which also causes a reduction in energy density. Also, the coated aramid may be separated from the substrate and act as a resistor during cell manufacture, which may be a cause of reduction of stability.

In the present disclosure, preferably, an air permeability of the porous separator membrane after being coated with the aramid is higher than 35%, but should not be reduced, in comparison to an air permeability of a polyolefin porous membrane. For example, the air permeability of the porous separator membrane coated with the aramid is preferably 400 sec/100 ml or less. When an upper bound of the air permeability is greater than 400 sec/100 ml, output characteristics reduce and battery performance degrades, and thus, applications for high output are unfavorable. It is preferable that the lower bound of the air permeability be lower, and the lower bound is not specially limited in the present disclosure. For example, the lower bound of the air permeability may be 100 sec/100 ml or greater, however the present disclosure is not limited in this regard.

In the present disclosure, the breaking strength of the porous separator membrane coated with the aramid should not be reduced, preferably by 50% or higher, more preferably by 30% or higher, in comparison to a breaking strength of a polyolefin itself. Due to tension applied to the separator membrane in the manufacture of coating the substrate with the aramid, elongation occurs to some extent, and if the breaking strength of the manufactured separator membrane is less than 500 kgf/cm2, an unreacted portion may be generated in the battery due to corrugation that may occur during manufacturing the battery, thereby further degrading the safety of the battery. Also, a higher breaking strength is preferable, and in the present disclosure, an upper bound on the breaking strength is not specially limited. For example, the breaking strength of the porous separator membrane coated with the aramid may be 2,000 kgf/cm2 or less, however the present disclosure is not limited in this regard.

Also, the lithium secondary battery of the present disclosure is characterized in that a cathode includes a cathode active material that is a lithium metal oxide having an olivine-type iron phosphate lithium coating layer, or an anode includes an anode active material that is a carbon material having a spinel-type lithium titanium oxide coating layer.

More specifically, coating of the surface of the cathode active material for the lithium secondary battery with the olivine-type iron phosphate lithium may suppress a side reaction with an electrolyte, and in a case in which an internal short circuit occurs, may prevent a thermal runaway phenomenon caused by overcurrent generation by controlling a movement speed of lithium ions and electrons migrating from an anode to a cathode, and coating of the surface of the anode with the spinel-type lithium titanium oxide may prevent a solid electrolyte interface (SEI) layer of an excessively high thickness from being formed on the surface of the anode and control a thermal runaway hazard, thereby improving electrochemical characteristics intrinsic to an existing lithium secondary battery as well as safety. Further, a synergy effect may be produced in terms of safety improvement for the battery when the separator membrane according to the present disclosure is used together.

In another aspect of the present disclosure, the cathode may include a cathode active material that is a lithium composite metal oxide having an olivine-type iron phosphate coating layer, and at the same time, the anode may include an anode active material that is a carbon material having a lithium titanium oxide coating layer. When the coated cathode active material and the coated anode active material are used together, the effects described in the foregoing may be produced, as well as further improved effects in terms of safety.

In the present disclosure, a core of the cathode active material may be any type of lithium metal oxide that can be used as a cathode active material for a lithium secondary battery in the art. For example, available lithium metal oxides may include, but not limited to, LiCoO2, LiNiO2, LiNiCoO2, LiNixCoyAlzO2 (0<x<1, 0<y<1, 0<z<1, x+y+z=1), LiNixCoyMnzO2 (0<x<1, 0<y<1, 0<z<1, x+y+z=1), and LiMn2O4, singularly or in combination.

In the present disclosure, an average particle diameter of the lithium metal oxide for the core of the cathode active material may be properly selected by a person having an ordinary skill in the art, and for example, 6 μm to 16 μm is preferable, however the present disclosure is not limited in this regard.

In the present disclosure, the olivine-type iron phosphate lithium is used as a material for forming a shell of the cathode active material. A content of the olivine-type iron phosphate lithium is preferably 1 part by weight to 3 parts by weight based on 100 parts by weight of lithium metal oxide, and in this instance, when the content is less than 1 part by weight, it is insufficient to cover the entire surface of the lithium metal oxide core, failing to prevent a side reaction in the electrolyte solution, and when the content is greater than 3 parts by weight, a surplus of olivine-type iron phosphate lithium fine-particle powder acts as a resistor and deteriorates the battery performance, and reduces safety due to continuous side reaction occurring in a low voltage range.

An average particle diameter of the olivine-type iron phosphate lithium according to the present disclosure is not specially limited if it is sufficient to coat the lithium metal oxide core, and for example, the average particle diameter may be 1 μm or less, however the present disclosure is not limited in this regard.

In the present disclosure, a core of the anode active material may be any type of carbon material that can be used as an anode active material for a lithium secondary battery in the art. For example, available carbon materials may include, but not limited to, low crystallinity carbon and high crystallinity carbon, and representatively, low crystallinity carbon includes soft carbon and hard carbon, and high crystallinity carbon includes high-temperature sintered carbon, such as, for example, natural graphite, Kish graphite, pyrolytic carbon, mesophase pitch based carbon fiber, meso-carbon microbeads, Mesophase pitches, petroleum pitch derived cokes, and coal tar pitch derived cokes.

In the present disclosure, an average particle diameter of the carbon material for the core of the anode active material may be properly selected by a person having an ordinary skill in the art, for example, 15 μm to 30 μm is preferable, however, the present disclosure is not limited in this regard.

In the present disclosure, the spinel-type lithium titanium oxide is used as a material for forming a shell of the anode active material. A content of the spinel-type lithium titanium oxide is preferably 1.5 parts by weight to 2.5 parts by weight based on 100 parts by weight of carbon material, and in this instance, when the content is less than 1.5 parts by weight, it is insufficient to completely surround the carbon material core, and rather, a more non-uniform SEI layer may be formed, so that a cycle life may be shortened and the SEI layer may be prone to destruction, resulting in a thermal runaway phenomenon, and when the content is greater than 2.5 parts by weight, surplus particles remaining after coating the carbon material core may act as a resistor and reduce the stability.

An average particle diameter of the spinel-type lithium titanium oxide according to the present disclosure is not specially limited if it is sufficient to coat the carbon material core, for example, the average particle diameter may be 1 μm or less, however the present disclosure is not limited in this regard.

Optionally, a metal oxide may be further included in the shell of the cathode active material and/or the anode active material to improve the coating performance. The metal oxide may be titanium dioxide, aluminum oxide, zirconium oxide, halfnium oxide, or thallium oxide, and more preferably, titanium dioxide.

Optionally, a conductive carbon may be further included in the shell of the cathode active material and/or the anode active material to improve the conductivity. The conductive carbon may be Super-P, Ketjen black, graphite, acetylene black, carbon nanotubes, activated carbon, and the like.

A method for coating the electrode active material core with the shell forming material may use wet coating and dry coating widely known in the art, and in this instance, the wet coating is a method of spraying onto or impregnating into the anode active material, a dispersion liquid or suspension liquid in which the coating material is dispersed or a solution in which the coating material is dissolved, followed by drying. The dry coating is a method of coating the surface of the core with the coating material for the shell in a mechanical manner. A shear force, a collision force, or a compression force is applied to produce a sphericity effect and a disintegration effect of the core material concurrently, thereby improving powder characteristics of the electrode active material. In the present disclosure, dry coating may be preferably employed.

When the electrode active material and the separator membrane according to the present disclosure are prepared, a lithium secondary battery may be manufactured hereafter according to a conventional method.

First, an electrode active material layer is formed on a current collector using an electrode active material composition including an electrode active material, a binder, a solvent, and optionally, a conductive material. In this instance, the electrode active material layer is formed such that the electrode active material composition is directly coated on the current collector, or such that the electrode active material composition is coated on a separate support and dried to form a film, and the film is peeled off from the support and laminated onto the current collector. Here, the support is not specially limited if it is capable of supporting the electrode active material layer, for example, a Mylar film, a polyethyleneterephthalate (PET) film, and the like.

The binder, the conductive material, and the solvent may all be typical ones used to manufacture a lithium secondary battery in the art.

The binder may be polyvinylidenefluoride-hexafluoropropylene copolymer (PVDF-co-HFP), polyvinylidenefluoride, polyacrylonitrile, polymethylmethacrylate, and mixtures thereof. Representatively, the conductive material may be carbon black or acetylene black, and the solvent may be acetone or N-methylpyrrolidone.

When electrodes are formed according to a method described in the foregoing, a separator membrane is interposed between a cathode electrode plate and an anode electrode plate, and an electrode assembly is manufactured. Subsequently, the manufactured electrode assembly is put into a case and an electrolyte liquid for a lithium secondary battery is injected, so that a lithium secondary battery of the present disclosure is completed.

Hereinafter, preferred embodiments of the present invention are described in detail with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

Example 1

Manufacture of Cathode and Anode

A core-shell cathode active material was prepared by a dry coating method using 2 parts by weight of olivine-type iron phosphate lithium (LiFePO4) having an average particle diameter of 1 μm, 0.1 parts by weight of TiO2, and 0.3 parts by weight of Super-P, based on 100 parts by weight of LiNi5Co2Mn3O2 having an average particle diameter of 10 μm.

A core-shell anode active material was prepared by a dry coating method using 2 parts by weight of lithium titanium oxide (Li4Ti5O12) having an average particle diameter of 1 μm, 0.1 parts by weight of TiO2, and 0.5 parts by weight of Super-P, based on 100 parts by weight of mesophase graphite powder (MGP) having an average particle diameter of 20 μm.

NOB-130 (Hosokawa Micron Corp., Japan) was used as a dry coating system. TiO2 was used to improve the coating performance, and Super-P was used to enhance the conductivity.

The prepared cathode active material was mixed with a conductive carbon as a conductive material, and polyvinylidenefluoride (PVdF) as a binder at a ratio of 93/3/4 and a proper amount of N-methylpyrrolidone (NMP) was added, so that a slurry having a proper viscosity was obtained and coated on an aluminum foil, dried, and compressed to obtain a cathode.

On the other hand, the prepared anode active material was mixed with a conductive carbon as a conductive material, and PVdF as a binder at a ratio of 85/8/7 and a proper amount of NMP was added, so that a slurry having a proper viscosity was obtained and coated on a copper foil, dried, and compressed to obtain an anode.

<Manufacture of Separator Membrane>

45 parts by weight of poly(meta-phenylene isophthalamide) and 55 parts by weight of N,N-Dimethylacetamide were mixed to prepare a slurry. The prepared slurry was coated onto both sides of a PE porous membrane (thickness: 16 μm) at a thickness of 3 μm each side using a die coater, so that a composite porous separator membrane having a total thickness of 22 μm was manufactured.

Scanning electron microscopy (SEM) images of each of the cathode active material, the anode active material, and the separator membrane before and after coating are shown in FIG. 1 (a: cathode active material, b: anode active material, c: separator).

Also, material property data of the separator membrane before and after coating are shown in Table 1.

TABLE 1

| | | Bare | Coated |
|---|---|---|---|
| Thickness [μm] | | 16 | 22 |
| Air permeability [sec/100 ml] (ISO-3687) | | 223 | 280 |
| HeatShrinkage | MD (Machine Direction) [%] | 60.2 | 13.0 |
| [150° C./1 hr] | TD (Traverse Direction) [%] | 60.2 | 11.1 |

Referring to Table 1, even after the aramid coating layer is formed, air permeability is not greatly reduced while thermal deformation is remarkably reduced.

<Manufacture of Battery>

After the manufactured separator membrane is interposed between the manufactured cathode and anode and a result was received in an aluminum outer member, a lithium secondary battery was manufactured by injecting a non-aqueous electrolyte solution in which LiPF6 is dissolved in a non-aqueous solvent to make 1.15 M, and in this example, the non-aqueous solvent in which ethylene carbonate and ethyl methyl carbonate are mixed at a volume ratio of 1:3. The battery had a size of 10 mm thickness×216 mm width×216 mm length and a design capacity of 40 Ah.

Example 2

A battery was manufactured by the same method as that of Example 1, except that mesophase graphite powder having an average particle diameter of 20 μm was used as an anode active material.

Example 3

A battery was manufactured by the same method as that of Example 1, except that LiNi5Co2Mn3O2 having an average particle diameter of 10 μm was used as a cathode active material.

Comparative Example 1

A battery was manufactured by the same method as that of Example 1, except that LiNi4Co3Mn3O2 having an average particle diameter of 9 μm was used as a cathode active material, mesophase graphite powder having an average particle diameter of 20 μm was used as an anode active material, and a polyethylene porous membrane was used as a separator membrane.

Comparative Example 2

A battery was manufactured by the same method as that of Example 1, except that LiNi4Co3Mn3O2 having an average particle diameter of 9 μm was used as a cathode active material and mesophase graphite powder having an average particle diameter of 20 μm was used as an anode active material.

Comparative Example 3

A battery was manufactured by the same method as that of Example 1, except that a polyethylene porous membrane coated with ceramic at both sides was used as a separator membrane.

Experimental Example 1

High Rate Discharge Characteristics and Room Temperature Cycle Characteristics The lithium secondary batteries manufactured according to the examples and the comparative examples were evaluated using a charge/discharge cycle system in terms of discharge characteristics and cycle characteristics at room temperature.

The discharge characteristics were tested by charging on conditions of CC-CV (constant current-constant voltage) of a charge C-rate of 0.5 C, a charge current 20 A, and a charge voltage of 4.2 V at 25° C., and after a resting stage of 20 minutes, discharging down to 2.7 V using a discharge C-rate of 0.5 C to 12.0 C.

The discharge characteristics were specified as a ratio of a discharge capacity at a discharge C-rate of 10 C and a discharge current of 20 A relative to a discharge capacity at a discharge C-rate of 0.5 C and a discharge current of 20 A, and shown in Table 2.

Also, the cycle characteristics were tested by charging and discharging the manufactured batteries on conditions of 1 C (charge C-rate)/1 C (discharge C-rate) at room temperature, and were specified as a 1,000th discharge capacity with respect to a 1st discharge capacity and its results are shown in Table 2.

Figure 3:
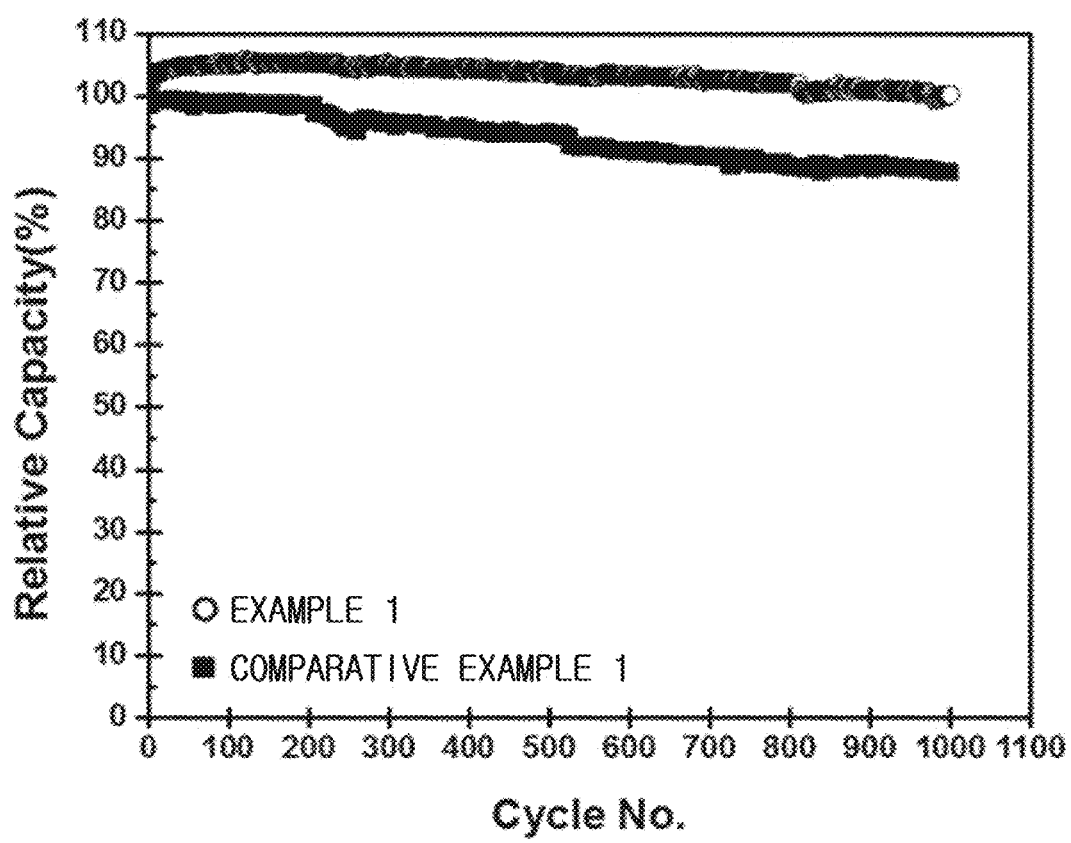
FIG. 3 is a graph showing life characteristics at room temperature for lithium secondary batteries manufactured according to Example 1 and Comparative Example 1.

Among them, discharge characteristics of the lithium secondary batteries manufactured according to Example 1 and Comparative example 1 are shown in FIG. 2 (a: Example 1, b: Comparative example 1), and life characteristics at room temperature of the lithium secondary batteries manufactured according to Example 1 and Comparative example 1 are shown in FIG. 3.

TABLE 2

|  | 10.0 C (discharge C-rate) discharge characteristics (@ 0.5 C (discharge C-rate)) | Efficiency in 1,000$^{th}$ cycle (%) @ R.T. (room temperature) |
| --- | --- | --- |
| Example 1 | 94.8% | 100.1% |
| Example 2 | 92.9% | 99.1% |
| Example 3 | 94.3% | 99.0% |
| Comparative example 1 | 15.6% | 87.7% |
| Comparative example 2 | 14.8% | 87.4% |
| Comparative example 3 | 94.5% | 99.6% |

When comparing the high rate discharge characteristics shown in Table 2 and FIG. 2, high rate discharge characteristics were improved by coating the surface of the cathode and anode active materials. Also, when comparing Comparative example 1 and Comparative example 2, no significant difference was found in discharge characteristics between the general polyethylene separator membrane and the composite separator membrane coated with aramid. This demonstrates that coating of the surface of the separator membrane with aramid does not deteriorate the electrical characteristics of the battery.

Also, decomposition of an electrolyte solution generally causes formation of a polymer membrane on the surface of a cathode active material, resulting in increased contact resistance and lithium ion loss by intercalation or disintercalation of lithium ions during cycling, and consequently, a change in the structure of the active material occurs as well as capacity reduction. However, from the cycle characteristics of Comparative example 1 and Comparative example 2 not coating the active material and the cycle characteristics of examples, it was judged that a decomposition reaction with the electrolyte solution is reduced through the coating of the surface of the cathode and anode active materials.

Experimental Example 2

Safety Evaluation

Figure 4:
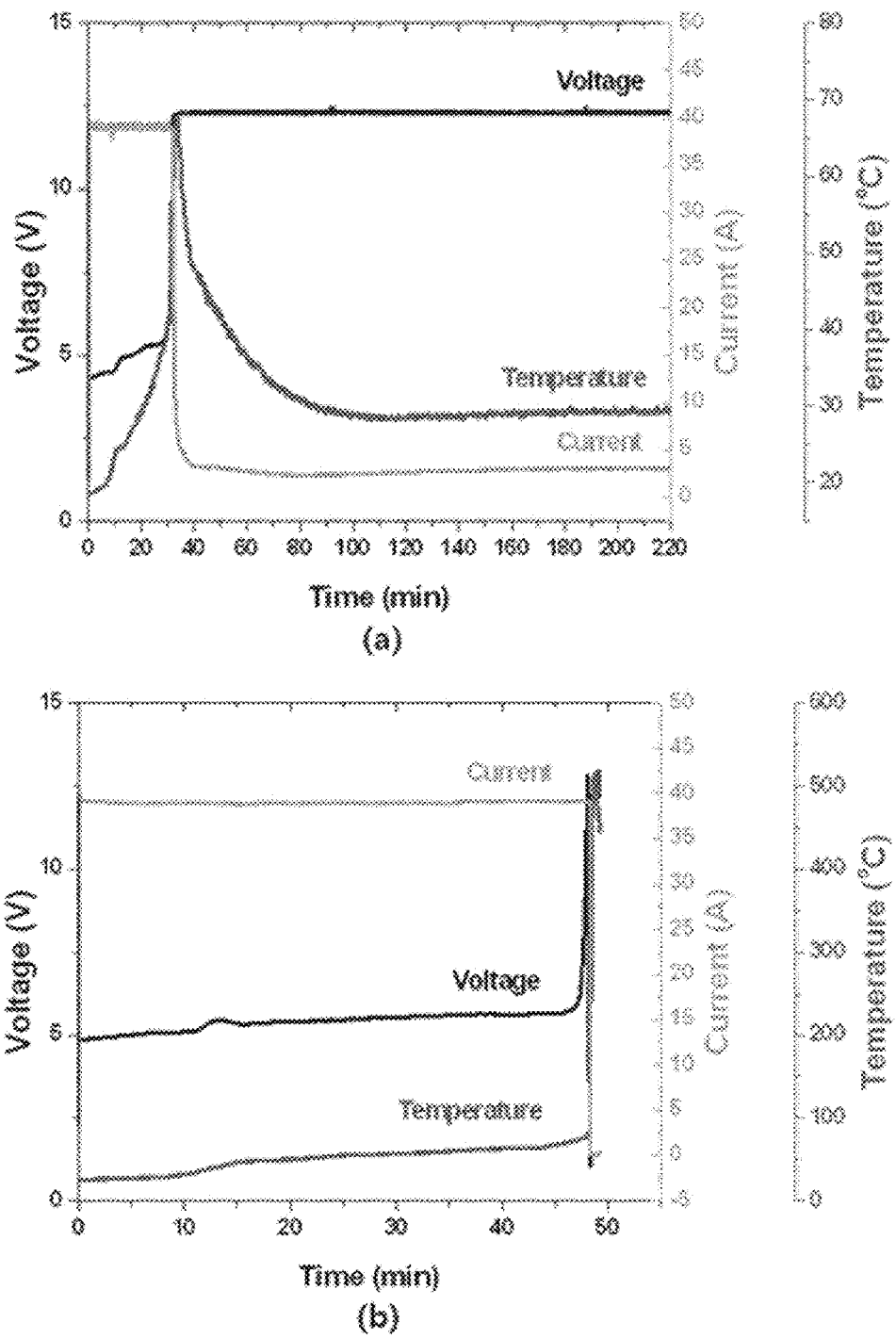
FIG. 4(a) is a graph showing battery behavior and surface temperature changes after an overcharge test at 12V for a lithium secondary battery manufactured according to Example 1.
FIG. 4(b) is a graph showing battery behavior and surface temperature changes after an overcharge test at 12V for a lithium secondary battery manufactured according to Comparative Example 1.
Figure 5:
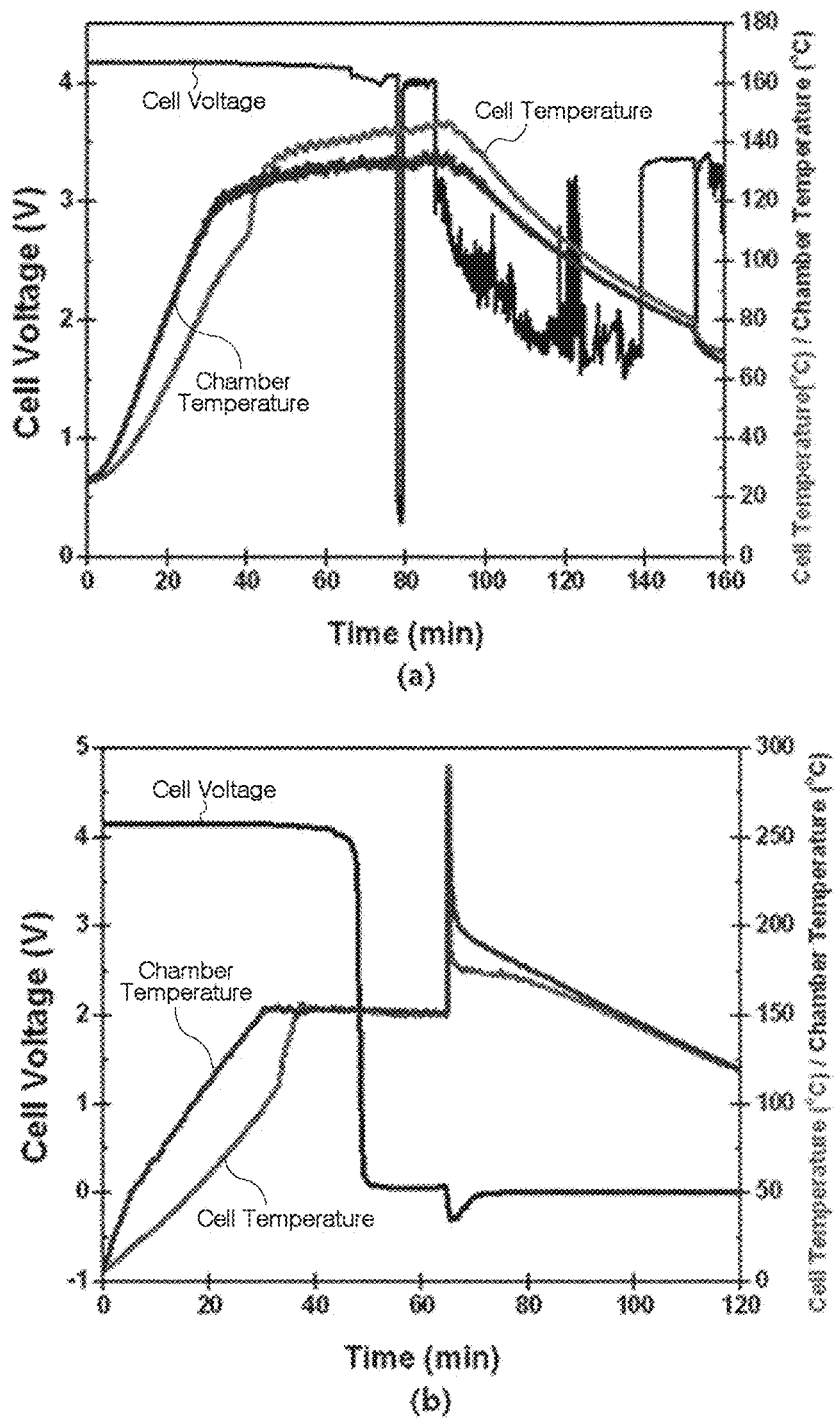
FIG. 5(a) is a graph showing battery behavior and temperature changes after a heat test at 150° C. for a lithium secondary battery manufactured according to Example 1.
FIG. 5(b) is a graph showing battery behavior and temperature changes after a heat test at 150° C. for a lithium secondary battery manufactured according to Comparative Example 1.
Figure 6:
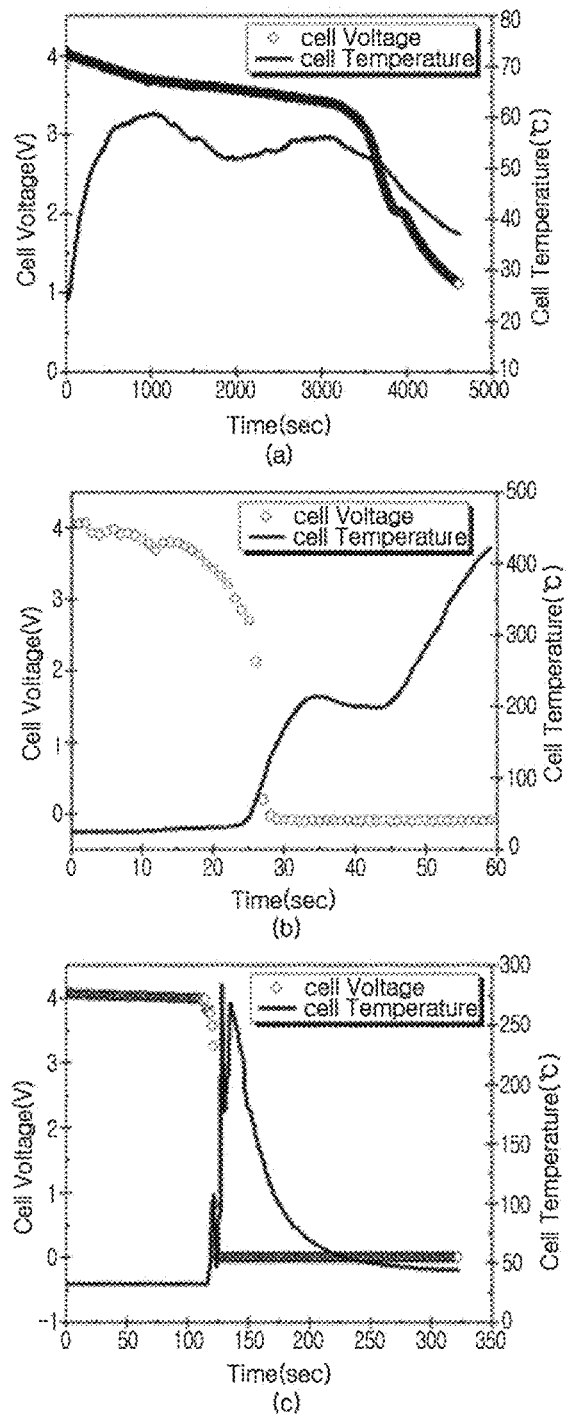
FIG. 6(a) is a graph showing battery behavior and surface temperature changes after a nail penetration test for a lithium secondary battery manufactured according to Example 1.
FIG. 6(b) is a graph showing battery behavior and surface temperature changes after a nail penetration test for a lithium secondary battery manufactured according to Comparative Example 1.
FIG. 6(c) is a graph showing battery behavior and surface temperature changes after a nail penetration test for a lithium secondary battery manufactured according to Comparative Example 3.

A shape change and a surface temperature change of a battery based on overcharge characteristics, thermal safety (heating characteristics), and nail penetration characteristics were measured using the batteries manufactured according to the examples and the comparative examples, and results are shown in Table 3, and voltage and temperature changes for each safety evaluation item are shown in FIG. 4 (overcharge characteristics), FIG. 5 (thermal safety), and FIG. 6 (nail penetration characteristics).

TABLE 3

| | Battery behavior, maximum battery surface temperature (° C.) | | |
|---|---|---|---|
| | Overcharge characteristics 1 C/12 V | Thermal safety 150° C./1 hr | Nail penetration characteristics 3Φ (80 mm/sec) |
| Example 1 | A, 67.9° C. | A | A, 60.9° C. |
| Example 2 | A, 79.6° C. | A | B, 156.3° C. |
| Example 3 | A, 88.4° C. | A | A, 89.5° C. |
| Comparative example 1 | D, 515° C. | C | D, 422.8° C. |
| Comparative example 2 | D, 475.2° C. | C | C, 397.1° C. |
| Comparative example 3 | A, 73.8° C. | A | C, 268.8° C. |

A: no change B: smoke generation C: fire D: explosion

As shown in Table 3, the examples generally exhibit excellent characteristics in terms of safety. Particularly, Comparative example 1 and Comparative example 2 using the active materials without surface coating exhibit very poor safety. Also, Comparative example 2 using the composite separator membrane coated with aramid but without coating of the surface of the active material has a reduced ability to control a heat generation amount and consequently exhibits poor safety.

Also, Comparative example 3 using the separator membrane coated with ceramic exhibits excellent characteristics in terms of overcharge characteristics but does not ensure sufficient heat resistance in terms of nail penetration characteristics, and because the separator membrane cannot maintain its shape due to generation of an instantaneous overcurrent and an increase in internal temperature caused by an internal short circuit, a fire occurs.

What is claimed is:

1. A lithium secondary battery comprising a cathode, an anode, and a separator membrane interposed between the cathode and the anode,
   wherein the separator membrane is a polyolefin porous membrane having an aramid coating layer, and
   wherein the cathode includes a cathode active material that is a lithium metal oxide having an olivine-type iron phosphate lithium coating layer, or the anode includes an anode active material that is a carbon material having a spinel-type lithium titanium oxide coating layer.

2. The lithium secondary battery according to claim 1, wherein the polyolefin porous membrane has a thickness between 10 μm and 30 μm.

3. The lithium secondary battery according to claim 1, wherein the aramid coating layer has a thickness between 2 μm and 10 μm.

4. The lithium secondary battery according to claim 1, wherein the aramid is a para-aramid, a meta-aramid, or a mixture thereof.

5. The lithium secondary battery according to claim 1, wherein the separator membrane has an air permeability of 400 sec/100 ml or less.

6. The lithium secondary battery according to claim 1, wherein an air permeability of the separator membrane has a reduced value by 35% or less based on an air permeability of a polyolefin porous membrane.

7. The lithium secondary battery according to claim 1, wherein the separator membrane has a breaking strength of 500 kgf/cm² or more.

8. The lithium secondary battery according to claim 1, wherein the lithium metal oxide is any one selected from the group consisting of $LiCoO_2$, $LiNiO_2$, $LiNiCoO_2$, $LiNi_xCo_yAl_zO_2$ (0<x<1, 0<y<1, 0<z<1, x+y+z=1), $LiNi_xCo_yMn_zO_2$ (0<x<1, 0<y<1, 0<z<1, x+y+z=1), and $LiMn_2O_4$, or combinations thereof.

9. The lithium secondary battery according to claim 1, wherein a content of the olivine-type iron phosphate lithium is 1 part by weight to 3 parts by weight based on 100 parts by weight of lithium metal oxide.

10. The lithium secondary battery according to claim 1, wherein the cathode active material further includes a metal oxide, a conductive carbon, or a mixture thereof in a shell.

11. The lithium secondary battery according to claim 1, wherein the carbon material is any one selected from the group consisting of soft carbon, hard carbon, natural graphite, Kish graphite, pyrolytic carbon, mesophase pitch based carbon fiber, meso-carbon microbeads, mesophase pitches, petroleum pitch derived cokes, and coal tar pitch derived cokes, or combinations thereof.

12. The lithium secondary battery according to claim 1, wherein a content of the spinel-type lithium titanium oxide is 1.5 parts by weight to 2.5 parts by weight based on 100 parts by weight of carbon material.

13. The lithium secondary battery according to claim 1, wherein the anode active material further includes a metal oxide, a conductive carbon, or a mixture thereof in a shell.

14. The lithium secondary battery according to claim 1, wherein the cathode includes a cathode active material that is a lithium composite metal oxide having an olivine-type iron phosphate coating layer, and the anode includes an anode active material that is a carbon material having a lithium titanium oxide coating layer.

* * * * *